US006621907B1

(12) United States Patent
Smith

(10) Patent No.: US 6,621,907 B1
(45) Date of Patent: Sep. 16, 2003

(54) MUTE CIRCUIT FOR USE WITH SWITCHING RELAYS

(76) Inventor: Randall C. Smith, 1317 Ross St., Petaluma, CA (US) 94954

( * ) Notice: Subject to any disclaimer, the term of this patent is extended or adjusted under 35 U.S.C. 154(b) by 0 days.

(21) Appl. No.: 09/339,217

(22) Filed: Jun. 24, 1999

(51) Int. Cl.[7] .............................................. H04B 15/00
(52) U.S. Cl. ......................... 381/94.5; 381/123; 330/51
(58) Field of Search ............................. 381/61, 62, 63, 381/118, 120, 123, 94.5; 330/259, 261, 55

(56) References Cited

U.S. PATENT DOCUMENTS 3,889,202 A * 6/1975 Susuki ........................ 330/51
4,181,895 A * 1/1980 Yoshida ....................... 330/51
4,675,905 A * 6/1987 Flora et al. .................... 381/81
4,723,295 A * 2/1988 Kosaka et al. .............. 381/123
5,151,942 A * 9/1992 Sasaki ....................... 381/94.5
5,161,198 A * 11/1992 Noble ........................ 381/123
5,399,927 A * 3/1995 Gruber et al. ................ 330/51
5,420,535 A * 5/1995 Nebuloni et al. ............. 330/51
5,703,528 A * 12/1997 Nebuloni et al. .......... 381/94.5
6,516,067 B1 * 2/2003 Lee ........................... 381/94.5

* cited by examiner

*Primary Examiner*—Xu Mei
(74) *Attorney, Agent, or Firm*—Baker Botts, LLP

(57) ABSTRACT

A mute circuit for momentarily inhibiting signal travel in the signal path having an input terminal and an output terminal in response to operation of a coil-operated relay. The signal path will preferably include a plurality of channel in parallel. A plurality of switch responsive coil-operated relays are disposed in the signal path with a separate unidirectional signal path coupling each of the coils of each of the coil-operated relays to a muting line with the coil of each said relay providing a signal on the muting line responsive to collapse of the magnetic field developed in the relay coil by the flow of current therethrough. A plurality of time controlled switching devices are responsive to a signal on the muting line from a coil to momentarily inhibit signal travel in the signal path. The timing circuit is included in the time controlled switching device to control the length of operation of the switch in response to a signal on the muting circuit. The time controlled switching device includes a FET transistor. Each channel includes a coil operated relay, the coil operated relay of each channel being coupled to the muting line.

20 Claims, 2 Drawing Sheets

MUTE CIRCUIT FOR USE WITH SWITCHING RELAYS

FIELD OF THE INVENTION

This invention relates to the use of relays as switching devices in audio equipment and primarily in conjunction with amplifiers for electric guitars which are used to provide muting of unwanted noise caused by the switching action of relays in high gain audio circuitry.

BACKGROUND AND BRIEF DESCRIPTION OF THE PRIOR ART

As amplifiers for electric guitars evolved in complexity, the types and methods of switching, such as, but not limited to different channels and different modes of operation, grew in importance. Several types of switching devices have been used and each has its virtues and drawbacks.

The field effect transistor (FET) is suitable for switching low voltage signals, however the signal voltages present at many points in a modem vacuum tube guitar amplifier exceed the capability of most FETs.

The light-dependent-resistor (LDR) is the most widely used device for switching in guitar amplifiers. By combining an LED light source and a photosensitive resistor in a light-tight package, the LDR is not so limited in signal voltage which it can handle but it has other serious drawback of its own. First, the LDR is an expensive device, presently costing in excess of one dollar even in very large quantities. Like the FET, the switching function of an LDR is limited to single-pole single-throw action so a great number of these devices (two dozen or more) may be required in a modem multi-function amplifier. Of even greater importance is the fact that the LDR is an imperfect on-off switch going neither fully ON nor fully OFF. Not only do the ON and OFF resistances vary greatly from device to device, but the time required to change from the on state to the off state also varies greatly. Furthermore, the resistance of a given LDR is affected by temperature. LDRs are also sensitive to assembly processing and can easily be damaged by heat during the solder operation or by moisture while solder flux is being washed away.

Relays, simple electro-mechanical devices, avoid all of the aforementioned problems while typically providing a double-pole double-throw switching operation for less than the cost of a single LDR. The ON resistance of a relay is a consistent essentially zero ohms; the off resistance is always essentially infinite. Relays are easy to handle, assemble and test but their one major liability has limited their use in guitar amplifiers, this being the fact that they provide a "pop" noise. Because a relay breaks and then remakes circuit continuity instantaneously, a very audible popping noise is typically generated. In circuits where substantial gain occurs after a relay is operated, the popping sound can easily be amplified to wildly unacceptable levels of loudness. In many applications, the brief period of time during which the relay is out-of-contact and in motion, a momentary volume surge may occur as well.

SUMMARY OF THE INVENTION

In accordance with the present invention, the above described problem of "pop" is substantially eliminated from the amplifier output and the use of relays is enabled throughout a guitar amplifier. This is accomplished by providing an FET mute circuit to shunt the audio circuit and conceal the popping noise caused by the relays. Such a mute circuit must be triggered to occur exactly in synchronism with the relay switching in order to be effective. To this end, the relays themselves are used as triggers for the mute circuit. All that is required is to insure that in every possible switching operation at least one relay is switching off.

An electro-magnet is used in a typical relay to actuate a mechanical switch mechanism. When current is removed from the electromagnetic coil, an inductive pulse is generated. In the present invention, the voltage momentarily generated by the collapsing magnetic field of the coil is used to trigger a bipolar switching transistor which then drives an FET arranged to shunt or short circuit the guitar signal. Such an arrangement may be used in one or more locations in the amplifier circuit. Because the action of the bipolar and field-effect transistors is so nearly instantaneous, the muting effect occurs sufficiently rapidly to blank out the unwanted popping noise.

A time constant circuit is preferably utilized to maintain muting action for any desired duration of time. In some amplifiers including a reverberation circuit, a duration time of two or three seconds may be useful to mute reverberation decay of the previous mode from overlapping with the mode instantly selected. For normal shunting of popping noise, the time constant may be adjusted to a fraction of a second, sufficiently long to mute the unwanted noise but not so long as to become a noticeable "drop out" of the musician. Because the duration of the shunt is determined by the component values of an out-board time-constant circuit, this duration is easily adjustable and there is no unpredictable variation from one FET to another.

DESCRIPTION OF THE PREFERRED EMBODIMENT

Figure 1:
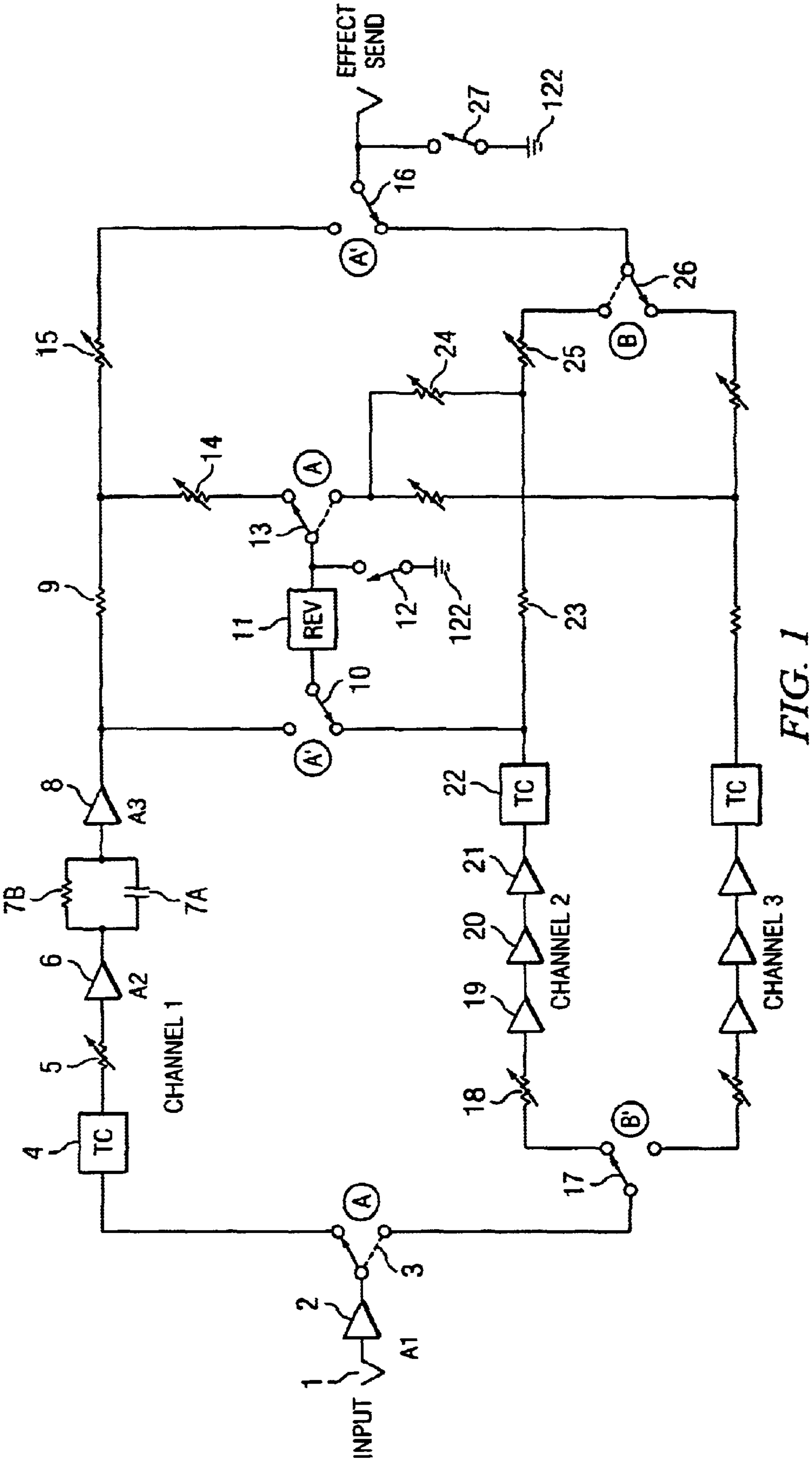
FIG. 1 is a block diagram of a modern three-channel guitar preamplifier showing the basic switching required in a guitar amplifier.

FIG. 1 is a block diagram of a modern three-channel guitar preamplifier which is simplified for clarity and illustrates the basic switching required, showing the locations of two noise shunts of the present invention with all relays shown in their power-off positions. Switch logic of the relays is indicated by the encircled letters. Relays are arranged to operate in pairs of alternating action: A and A' being one, such pair and B and B' being another such pair. As will become apparent when studying both FIGS. 1 and 2, the initiation of power to the circuit of FIG. 2 causes the positions of the A and B relays to reverse from the positions shown in FIG. 1 such that the amplifier will be configured for channel 2 operation.

In FIG. 1. an input terminal 1 receives electric guitar signals in the form of a small voltage which is coupled to first amplifier 2 whose output is coupled to a relay switch device 3. Relay 3 alternately couples signal to. Channel 1, as shown, or to either of Channels 2 or 3 shown by a dashed line. The logic of relay 3 is indicated by the letter A and, upon initiation of power, the A type logic of relays 3 and 13 causes them to switch to the dashed line positions, as does the B type logic of relay 26.

For the purpose of simple illustration of the audio signal path of Channel 1, the signal from the guitar is coupled from first amplifier 2 by relay 3 through a tone control circuit. 4 and a user-adjustable gain attenuator 5 into a second voltage amplifier 6. Amplified signal from amplifier 6 is thence coupled through a fixed attenuator pad comprising capacitor 7A and resistor 7B where frequency response is cultivated. A third voltage amplifier 8 restores signal amplitude and feeds both a reverberation circuit 11 and a fixed attenuator 9 across which reverberation is developed. The input signal to the reverberation circuit 11 is selected by relay 10 whose logic, as indicated by letter A', is opposite to that of relay 3 and thus remains in the position shown after power is applied to the circuit.

Output from the reverberation circuit 11 is shunted to ground 122 by an FET noise mute circuit 12 (shown as a switch) of the present invention. As mentioned above, the time duration for the shunt in this location may be set to two or three seconds—enough time to allow full decay of the previous channel's reverberation before the shunt swells open to allow reverberated signal to be mixed with the presently selected channel. Although 2 or 3 seconds may sound improperly, long, it is in actual practice, virtually unnoticeable. The "dry" or non-reverberated primary signal is not dropped out during this time and what is avoided is lingering reverberation of signals played one or two seconds prior and in completely different mode of amplifier tonality. Moreover, the transition into a clean mode from one of heavy distortion involves relative settings such that the reverberated signal "overhanging" from the distortion mode may well become far louder once the rhythm mode is selected than it was originally. Thus, the present invention with an extended shunt time may be employed to prevent an objectionable reverberation interference in addition to the masking of brief relay popping noises.

After the FET mute circuit 12, a relay 13 assigns reverberation output to either Channel 1 as shown, or to both Channels 2 and 3. Relay 13 is switched according to logic A. An adjustable attenuator 14 determines the level of reverberation signal which is to be mixed with the "dry " primary signal of Channel 1. A master volume attenuator 15 controls the amplitude of Channel 1 signal delivered to output relay 16 which is switched according to logic A'.

Returning now to relay 3, when channel 1 is not selected, relay 3 will direct signal from first amplifier 2 to relay 17 as shown by the dashed line. Relay 17, using logic B', further selects one of the distortion modes which are comprised of Channel 2 and Channel 3. Referring first to Channel 2, a variable gain attenuator 18 controls the amount of overdrive saturation which occurs through the cascading sequence of distortion amplifiers 19, 20 and 21. A tone control 22 acts on the distortion signals and its output is fed both to the reverberation selector relay 10 and a fixed attenuator resistor 23 across which reverberation is developed. Output from the reverberation circuit 11 is coupled through relay 13 after being properly muted by the FET shunt circuit 12. A reverberation attenuator 24 controls the relative mix of reverberation joining with the attenuated primary signal from fixed resistor 23. The amplitude of the combined signals is adjustable by the Channel 2 master volume control 25 whose output feeds another relay 26 which selects either Channel 2 or Channel 3 and couples the selected output signal to output relay 16. Circuitry for Channel 3 is, for the purpose of this disclosure, essentially the same as that of Channel 12 and the components therein are accordingly numbered the same as for Channel 2. However, in actual practice, many voicing elements (not shown) may be altered to expand the versatility of the overall amplifier. Final output from the amplifier, as selected by relay 16 , may be subjected to an FET noise mute 27 (shown as a switch) of the present invention. In this location, the duration of the shunt would be set typically to a fraction of a second—just long enough to mask the popping noise caused by the relays. Another virtue of this circuit location for an FET noise mute is to prevent an unwanted switching pop from entering an outboard effect unit, especially, for example, a signal delay device where the pop (if not muted) would be repeated several times before dying out. A further mute FET may be added at some point later in the circuit as well to further reduce the presence of unwanted switching noise caused by the relays.

Figure 2:
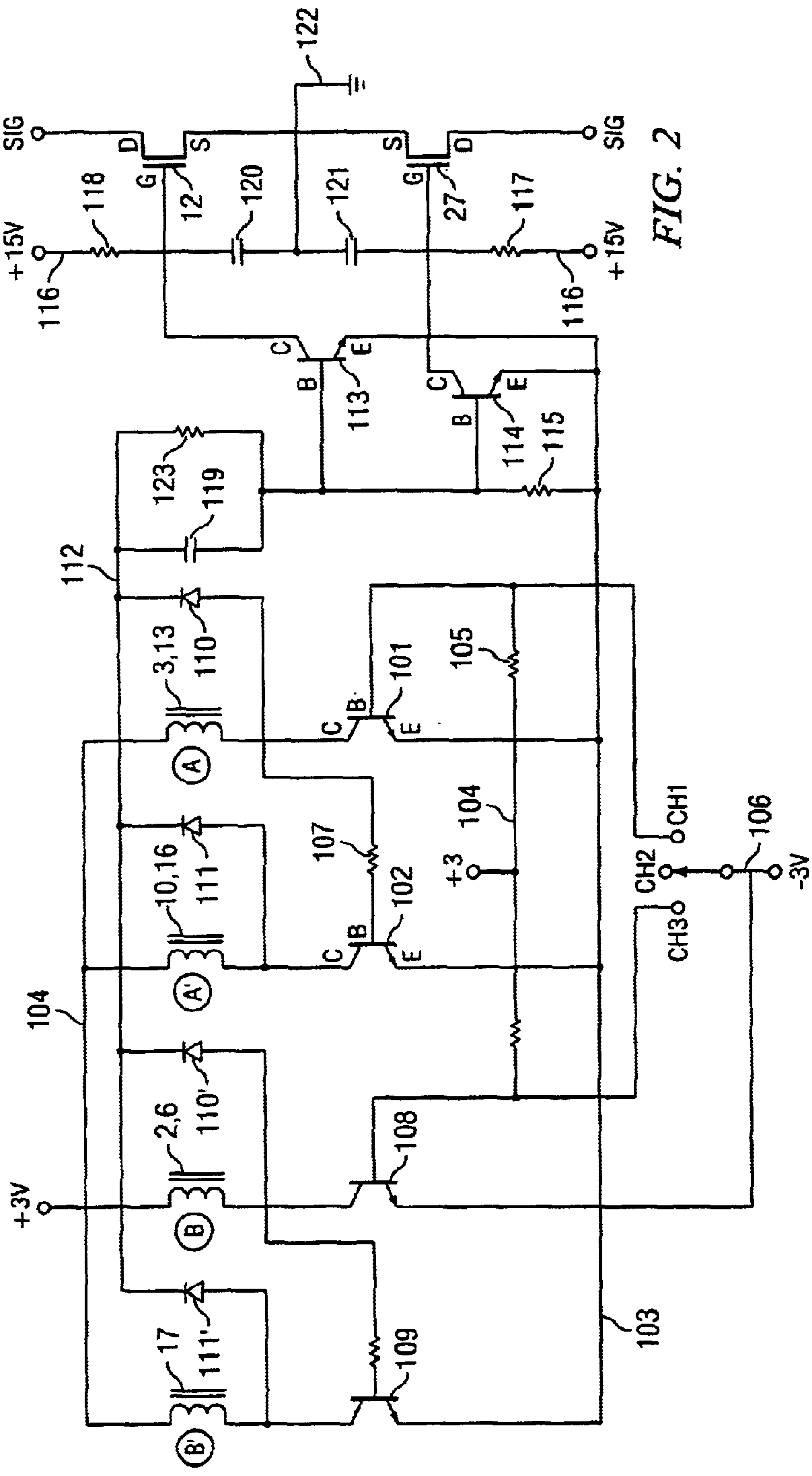
FIG. 2 is a schematic diagram showing a preferred embodiment of the present invention and its relation to the switching circuitry required for the amplifier of FIG. 1 with any possible switching operation including at least one relay being turned off and therefore triggering the noise mute circuit.

In the schematic diagram of FIG. 2, in which operation of the switches 3, 12, 13, 17, 26, and 27 of FIG. 1 is described in detail in response to operation of the channel selector 106, a first alternating pair of switching transistors 101, 102 are arranged between the negative 3 volt rail 103 and a pair of relays 13, 16. Using identification numbers common to the switching elements of FIG. 1, a 6 volt relay actuation coil 3, 13 is connected between the positive 3 volt supply 104 and the collector element C of transistor 101. When power is applied to the circuit and the channel selector switch 106 is in the Channel 2 position, the base element B of transistor 101 is connected to the positive rail 104 through bias resistor 105. Thus, the transistor 101 is biased to the ON voltage through bias resistor 107 which is connected to the collector C of transistor 101. When transistor 101 is in the ON state, the voltage on its collector C corresponds nearly to that of the negative supply rail 103 and the transistor 102 is driven OFF to produce switch logic A' in relay coil 10, 16. Thus, as transistor 101 switches ON, it also switches transistor 102 OFF.

When channel selector switch 106 is set to its Channel 1 position, the base B of transistor 101 is coupled to the negative 3 volt supply and the transistor 101 is switched OFF, no longer conducting from its emitter E to its collector C. Given the "open" or non-conducting state of transistor 101, voltage at its collector C now becomes positive, supplied from the rail 104 through the series connection of the relay coil 3, 13. Thus, with the positive voltage on its base B, transistor 102 assumes the ON state and actuates relay coil 10, 16 by coupling it between the negative 103 and positive 104 supply rails. Thus, the action of switching transistor 101 OFF or non-conducting has the simultaneous result of switching transistor 102 ON and alternate logic between A and A' is achieved.

The channel selector switch 106 as illustrated would represent a manual device supplied for redundancy and shown here for clarity. In an actual amplifier, a footswitch or other remote device would accomplish similar switching to that shown by channel selector 106.

A second alternating pair of switching transistors 108, 109 functions identically to those just described and in fact any number of additional pairs could be added, each pair corresponding to added channels in an amplifier. The only requirement of the invention of the present disclosure is that every possible switching operation include the turning OFF of at least one relay And as each relay is turned OFF, the collapsing magnetic field in its coil 3, 13; 10, 16, for example, generates an inductive voltage pulse. This voltage pulse is conducted by diodes 110, 111 or 110', 111', for example, to a pulse bus 112 and triggers one or more NPN switching transistors 113, 114. In FIG. 2, two such switching transistors 113, 114 are shown Both switching transistors 113, 114 have their emitter elements 113E and 114E and their base elements 113B, 114B coupled to ground 122, the base elements of each of these transistors so coupled through a bias resistor 115. Therefore, the transistors are normally biased to their OFF state and thus they permit voltage from a higher voltage positive supply 116 to flow through resistors 117, 118 to the gates G of a pair of muting FETs 12, 27 and to charge time-constant capacitors 120 and 121. The FET devices 12, 27 correspond to the mute switches having the identical character references in FIG. 1 and are coupled between common ground 122 and two different signal points as described above In their normal state, the mute FETs 12, 27 are biased open and have no effect on the signal voltage passing by.

Any time a channel or mode switching operation occurs, the resulting voltage pulse on bus 112 is coupled through capacitor 119 to the base of one or more pulse-driving or switching transistors, two such transistors 113, 114 being shown in the present embodiment of the invention. A resistor 123 in parallel with capacitor 119 prevents the build-up of a static charge across the capacitor 119, but is not part of a time constant circuit for purposes of mute duration. That function (mute duration) is determined by the relationship of capacitor 121 and resistor 117 for mute FET 27 and by capacitor 120 and resistor 118 for mute FET 12. With the action of any switching operation, the momentary voltage pulse coupled to the bases of the driver transistors 113B, 114B causes momentary coupling of the negative coupling of ground 122 to the positive FET gates 12G, 27G through the transistors 113, 114. This action discharges capacitors 120, 121 and momentarily biases the FETs 12, 27 such that they are switched ON to shunt and mute guitar amplifier signal. The FETs 12, 27 will remain ON and conducting until positive voltages in the capacitors 120, 121 have been recharged through resistors 118, 117 respectively to levels sufficient to return the FETs 12, 27 to their OFF states at which time the muting shunt action gently ceases. More than one mute FET may be driven from a single driver transistor but, unless they share a common shunt duration, a blocking diode for a separate driver transistor is required to isolate each different time-constant recharge circuit. As described above, a longer duration shunt may be desirable for muting of the reverberation circuit whereas a much shorter duration shunt can successfully mute the switching noise caused by the use of relays in a high gain amplifier.

Though the invention has been described with reference to a specific preferred embodiment thereof, many variations and modification will immediately become apparent to those skilled in the art. It is therefore the intention that the appended claims be interpreted as broadly as possible in view of the prior art to include all such variations and modifications.

What is claimed is:

1. A mute circuit for momentarily inhibiting signal travel in the signal path in response to operation of a coil-operated relay, comprising:

a signal path having an input terminal and an output terminal;

a plurality of switch responsive coil-operated relays in said signal path;

a separate unidirectional signal path coupling at least one of said coils of each of said coil-operated relays to a muting line, the coil of each said relay providing a signal on said muting line responsive to collapse of the magnetic field developed therein by the flow of current therethrough; and a time controlled switching device responsive to a signal on said muting line from a said coil to momentarily inhibit signal travel in said signal path.

2. The circuit of claim 1 wherein said signal path includes a plurality of signal channels disposed in parallel relationship to each other.

3. The circuit of claim 2 wherein only one of said signal channels is in operation at any given time.

4. The circuit of claim 3 wherein said time controlled switching device includes a FET transistor.

5. The circuit of claim 4 wherein each of said channels includes a said coil operated relay, the soil operated relay of each of said channels coupled to said muting line.

6. The circuit of claim 3 wherein each of said channels includes a said coil operated relay, the coil operated relay of each of said channels coupled to said muting line.

7. The circuit of claim 3 further including a timing circuit included in said time controlled switching device to control the length of operation of said switch in response to a signal on said muting circuit.

8. The circuit of claim 7 wherein each of said channels includes a said coil operated relay, the coil operated relay of each of said channels coupled to said muting line.

9. The circuit of claim 7 wherein said time controlled switching device includes a FET transistor.

10. The circuit of claim 9 wherein each of said channels includes a said coil operated relay, the coil operated relay of each of said channels coupled to said muting line.

11. The circuit of claim 1 wherein said time controlled switching device includes a FET transistor.

12. The circuit of claim 1 further including a timing circuit included in said time controlled switching device to control the length of operation of said switch in response to a signal on said muting circuit.

13. The circuit of claim 12 wherein said time controlled switching device includes FET transistor.

14. The circuit of claim 2 wherein each of said channels includes a said coil operated relay, the coil operated relay of each of said channels coupled to said muting line.

15. The circuit of claim 2 wherein said time controlled switching device includes a FET transistor.

16. The circuit of claim 15 wherein each of said channels includes a said coil operated relay, the coil operated relay of each of said channels coupled to said muting line.

17. The circuit of claim 2 further including a timing circuit included in said time controlled switching device to control the length of operation of said switch in response to a signal on said muting circuit.

18. The circuit of claim 17 wherein each of said channels includes a said coil operated relay, the coil operated relay of each of said channels coupled to said muting line.

19. The circuit of claim 17 wherein said time controlled switching device includes a FET transistor.

20. The circuit of claim 19 wherein each of said channels includes a said coil operated relay, the coil operated relay of each of said channels coupled to said muting line.

* * * * *